(12) United States Patent
Park

(10) Patent No.: US 7,838,879 B2
(45) Date of Patent: Nov. 23, 2010

(54) ARRAY SUBSTRATE HAVING ENHANCED APERTURE RATIO, METHOD OF MANUFACTURING THE SAME AND DISPLAY DEVICE HAVING THE SAME

(75) Inventor: Jin-Suk Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/493,364

(22) Filed: Jul. 26, 2006

(65) Prior Publication Data

US 2007/0029609 A1 Feb. 8, 2007

(30) Foreign Application Priority Data

Jul. 29, 2005 (KR) .................. 10-2005-0069583

(51) Int. Cl.
*H01L 31/14* (2006.01)

(52) U.S. Cl. .................... 257/59; 257/71; 257/72; 257/296; 257/300; 257/E27.093; 257/E27.043; 257/E27.037; 349/38; 349/39

(58) Field of Classification Search .................... None
See application file for complete search history.

(56) References Cited

U.S. PATENT DOCUMENTS

| | | | | |
|---|---|---|---|---|
| 6,078,366 A * | 6/2000 | Dohjo et al. | ................. | 349/43 |
| 6,130,463 A * | 10/2000 | Oda et al. | ................. | 257/384 |
| 6,674,495 B1 * | 1/2004 | Hong et al. | ................. | 349/43 |
| 6,833,881 B2 * | 12/2004 | Lee et al. | ................. | 349/39 |
| 7,198,968 B2 * | 4/2007 | Chae et al. | ................. | 438/30 |
| 2002/0105603 A1 * | 8/2002 | Yoo et al. | ................. | 349/38 |
| 2004/0113149 A1 * | 6/2004 | Kim | ................. | 257/59 |
| 2004/0119899 A1 * | 6/2004 | Miyazaki et al. | ............. | 349/38 |
| 2004/0233343 A1 * | 11/2004 | Baek | ................. | 349/38 |
| 2005/0078246 A1 * | 4/2005 | Yoo et al. | ................. | 349/122 |
| 2005/0242347 A1 * | 11/2005 | Lai | ................. | 257/59 |
| 2006/0098131 A1 * | 5/2006 | Lai | ................. | 349/43 |

FOREIGN PATENT DOCUMENTS

CN 1605920 4/2005

* cited by examiner

*Primary Examiner*—Victor A Mandala
*Assistant Examiner*—Fei Fei Yeung Lopez
(74) *Attorney, Agent, or Firm*—F. Chau & Associates, LLC

(57) ABSTRACT

An array substrate includes a substrate, a thin film transistor, a passivation layer, a pixel electrode and a storage capacitor. The thin film transistor includes a gate electrode formed on the substrate, a gate insulation layer formed on the substrate having the gate electrode, a semiconductor layer formed on the gate insulation layer and a data electrode formed on the semiconductor layer. The passivation layer is formed on the substrate having the data electrode and the pixel electrode is electrically connected to the data electrode through a contact hole formed through the passivation layer. The storage capacitor includes a first storage capacitor electrode that is spaced apart from the gate electrode of the thin film transistor and a second storage capacitor electrode that is formed on the gate insulation and including a same material as the pixel electrode.

6 Claims, 7 Drawing Sheets

ARRAY SUBSTRATE HAVING ENHANCED APERTURE RATIO, METHOD OF MANUFACTURING THE SAME AND DISPLAY DEVICE HAVING THE SAME

CROSS-REFERENCE TO RELATED APPLICATIONS

The present application claims priority from Korean Patent Application No. 2005-0069583, filed on Jul. 29, 2005, the disclosure of which is incorporated herein by reference in its entirety.

BACKGROUND OF THE INVENTION

1. Technical Field

The present disclosure relates to an array substrate, a method of manufacturing of the array substrate, and a display device having the array substrate. More particularly, the present disclosure relates to an array substrate capable of enhancing aperture ratio without reducing capacitance, a method of manufacturing the array substrate, and a display device having the array substrate.

2. Discussion of the Related Art

A liquid crystal display (LCD) device displays an image by controlling light transmittance using an electric field.

An LCD device includes an LCD panel having a liquid crystal cells arranged in a matrix, a driving section driving the LCD panel and a backlight assembly providing light with the LCD panel.

The LCD panel includes an array substrate having a plurality of thin film transistor (TFT), a substrate facing the array- substrate and a liquid crystal layer interposed between the array substrate and the substrate.

The LCD panel is provided with pixel electrodes and a common electrode to apply an electric field to each liquid crystal cell. Pixel electrodes are formed on the array substrate, whereas the common electrode is formed on the substrate. Each of pixel electrodes is connected to a drain electrode of the TFT. The pixel electrode along with the common electrode drives the liquid crystal cell to apply an electric filed in response to a data signal applied via the TFT.

Hereinafter, a conventional LCD device will be explained referring to FIG. 1

FIG. 1 is a cross-sectional view illustrating a conventional LCD panel.

Referring to FIG. 1, an array substrate includes a switching device 101, a storage capacitor 102 and a pixel electrode 103.

The switching device 101 includes a gate electrode 104 that is electrically connected to one of the gate lines, a gate insulation layer 105, a source electrode that is electrically connected to one of the data lines, and a drain electrode that is electrically connected to the pixel electrode 103.

When a control signal is applied to the gate electrode 104, a pixel voltage is applied to the pixel electrode 103. An electric field is generated between the pixel electrode 103 of the array substrate and the common electrode of the substrate facing the array substrate.

In response to changes in the electric field that is applied to the liquid crystal layer interposed between the pixel electrode 103 and the common electrode, an arrangement of liquid crystal molecules of the liquid crystal layer is changed to alter optical transmittance, thereby an image is displayed.

The storage capacitor 102 can function as an auxiliary capacitor to maintain the capacitance of the liquid crystal layer for one frame.

When the capacitance of the liquid crystal layer is influenced by the peripheral voltage after receiving the data voltage, the storage capacitor 102 prevents the capacitance of the liquid crystal layer from varying and supplements the auxiliary capacitance to maintain the data voltage for one frame. Therefore, when the capacitance of the storage capacitor 102 increases, a display quality of the LCD panel is enhanced.

The capacitance of the storage capacitor 102 is linearly proportional to the area of the storage capacitor and inversely proportional to the thickness of the dielectric layer of the storage capacitor. In other words, when a thickness of the gate insulation layer 105 decreases and an overlapping area between the two electrodes defining the storage capacitor 102 increases, the capacitance of the storage capacitor 102 increases.

However, when the overlapping area between two electrodes of the storage capacitor 102 increases, an aperture ratio of the LCD panel decreases.

SUMMARY OF THE INVENTION

Embodiments of the present invention provide an array substrate capable of improving an aperture ratio, a method of manufacturing the above-mentioned array substrate, and a display device having the above-mentioned the array substrate.

An array substrate in accordance with an embodiment of the present invention includes a transparent substrate, a thin film transistor (TFT), a passivation layer, a pixel electrode and a storage capacitor. The TFT includes a gate electrode formed on the transparent substrate, a gate insulation layer formed on the transparent substrate having the gate electrode, a semiconductor layer formed on the gate insulation layer and a data electrode formed on the semiconductor layer. The passivation layer is formed on the transparent substrate having the data electrode and the pixel electrode is formed on the transparent substrate having the passivation layer and connected to the data electrode through a contact hole formed through the passivation layer.

The storage capacitor includes a first storage capacitor electrode that is spaced apart from the gate electrode of the thin film transistor and a second storage capacitor electrode that is formed on the gate insulation layer, which is positioned over the first storage capacitor electrode and includes a same material as that of the pixel electrode.

A method of manufacturing an array substrate in accordance with an embodiment of the present invention, a gate electrode, a first storage capacitor electrode and a gate line that is electrically connected to the gate electrode are formed by patterning a metal layer formed on a transparent substrate. A gate insulation layer is formed on the transparent substrate having the gate electrode, the first storage capacitor electrode and the gate line formed thereon. A semiconductor layer is formed on the gate insulation layer in a thin film transistor region corresponding to the gate electrode. A data electrode and a data line that is electrically connected to the data electrode are formed by patterning a metal layer on the transparent substrate having the semiconductor layer formed thereon. A passivation layer is formed on the transparent substrate having the data electrode and the data line formed thereon and patterned to form a contact hole and to expose the gate insulation layer corresponding to the first storage capacitor electrode. Then, a transparent conductive layer is formed on the patterned passivation layer and patterned to form a pixel electrode that is electrically connected to the data electrode through the contact hole and a second storage electrode that is formed on the gate insulation layer and positioned over the first storage capacitor electrode.

A method of manufacturing an array substrate in accordance with an embodiment of the present invention, a gate electrode, a first storage capacitor electrode and a gate line that is electrically connected to the gate electrode are formed by patterning a metal layer formed on a transparent substrate. A gate insulation layer is formed on the transparent substrate having the gate electrode, the first storage capacitor electrode and the gate line formed thereon. A semiconductor layer is formed on the gate insulation layer in a thin film transistor region corresponding to the gate electrode. A data electrode and a data line that is electrically connected to the data electrode are formed by patterning a metal layer on the transparent substrate having the semiconductor layer formed thereon. A passivation layer and an insulation layer are formed on the transparent substrate having the data electrode and the data line formed thereon. A photo resist layer is coated on the transparent substrate having the insulation layer formed thereon. The photo resist layer corresponding to the data electrode and the first storage capacitor electrode is removed. The insulation layer corresponding to the data electrode is removed to expose the passivation layer and the insulation layer corresponding to the first storage capacitor electrode is removed to remain a portion of the insulation layer by photolithography process using a partial exposure mask. The passivation layer corresponding to the data electrode and the first storage capacitor electrode is removed by using a photo resist pattern. Then, a transparent conductive layer is formed on the insulation layer to form a pixel electrode that is electrically connected to the data electrode and a second storage electrode that is formed on the gate insulation layer and positioned over the first storage capacitor electrode.

A method of manufacturing an array substrate in accordance with an embodiment of the present invention, a gate electrode, a first capacitor electrode and a gate pad electrode that is electrically connected to the gate electrode are formed by patterning a metal layer formed on a transparent substrate. A gate insulation layer is formed on the transparent substrate having the gate electrode, the first capacitor electrode and the gate pad electrode formed thereon. A semiconductor layer is formed on the gate insulation layer in a thin film transistor region corresponding to the gate electrode. A data electrode and a data pad electrode that is electrically connected to the data electrode are formed by patterning a metal layer on the transparent substrate having the semiconductor layer formed thereon. A passivation layer is formed on the transparent substrate having the data electrode and the data pad electrode formed thereon and patterned to form a contact hole and to expose the gate insulation layer corresponding to the first capacitor electrode and the gate pad electrode. A portion of the gate insulation layer in a gate pad region is removed to expose the upper and side portion of the gate pad electrode. Then, a transparent conductive layer is formed on the insulation layer to form a pixel electrode that is electrically connected to the data electrode, a second storage electrode that is formed on the gate insulation layer and positioned over the first storage capacitor electrode and a pad electrode that is electrically connected to the gate pad electrode.

The display device in accordance with an embodiment of the present invention, the display device includes a liquid crystal capacitor and a storage capacitor. The liquid crystal capacitor is electrically connected to a thin film transistor having a gate electrode, a data electrode including source electrode and a drain electrode that is spaced apart from the source electrode and a gate insulation layer that is disposed between the gate electrode and the data electrode.

The storage capacitor is electrically connected to the liquid crystal capacitor in parallel to maintain a pixel voltage applied to the liquid crystal capacitor for one frame. The storage capacitor includes a first storage capacitor electrode and a second storage capacitor electrode and the gate insulation layer disposed between the first and the second storage capacitor electrodes. The second storage capacitor electrode includes a same material as that of the liquid crystal capacitor.

According to embodiments of the present invention, a storage capacitor has enhanced a capacitance of the storage capacitor without increasing the size of the storage capacitor.

In addition, an aperture ratio is enhanced without reducing the capacitance of the storage capacitor 302 by removing a part of the passivation layer corresponding to a storage capacitor region by using a partial exposure process.

BRIEF DESCRIPTION OF THE DRAWINGS

Exemplary embodiment of the present invention can be understood in more detail from the following descriptions taken in conjunction with the accompanying drawings, in which.

DESCRIPTION OF THE EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein.

Hereinafter, embodiments of the present invention will be described in detail with reference to the accompanying drawings.

Figure 1:
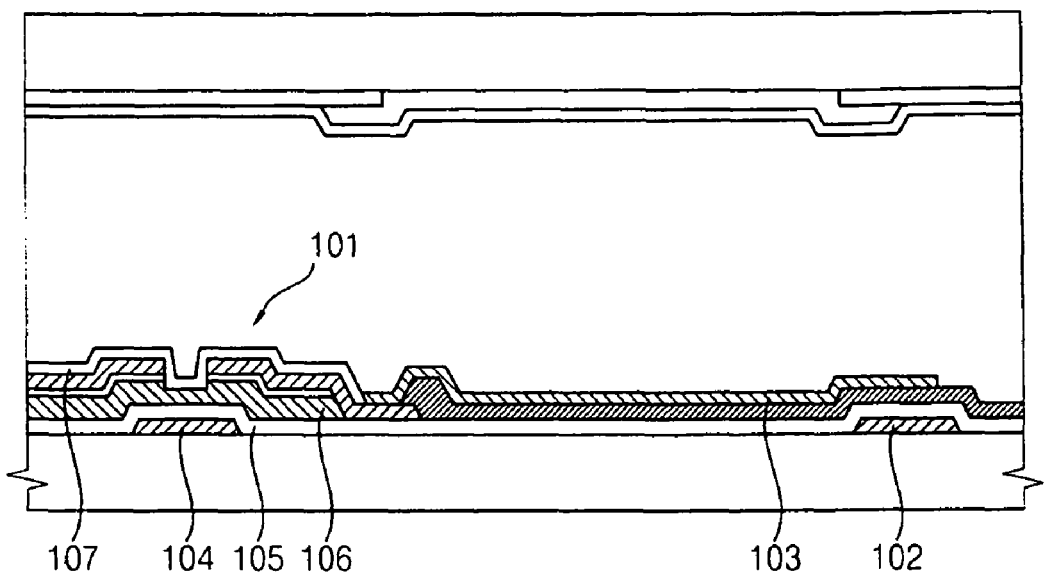
FIG. 1 is a cross-sectional view illustrating a conventional LCD panel.
Figure 2:
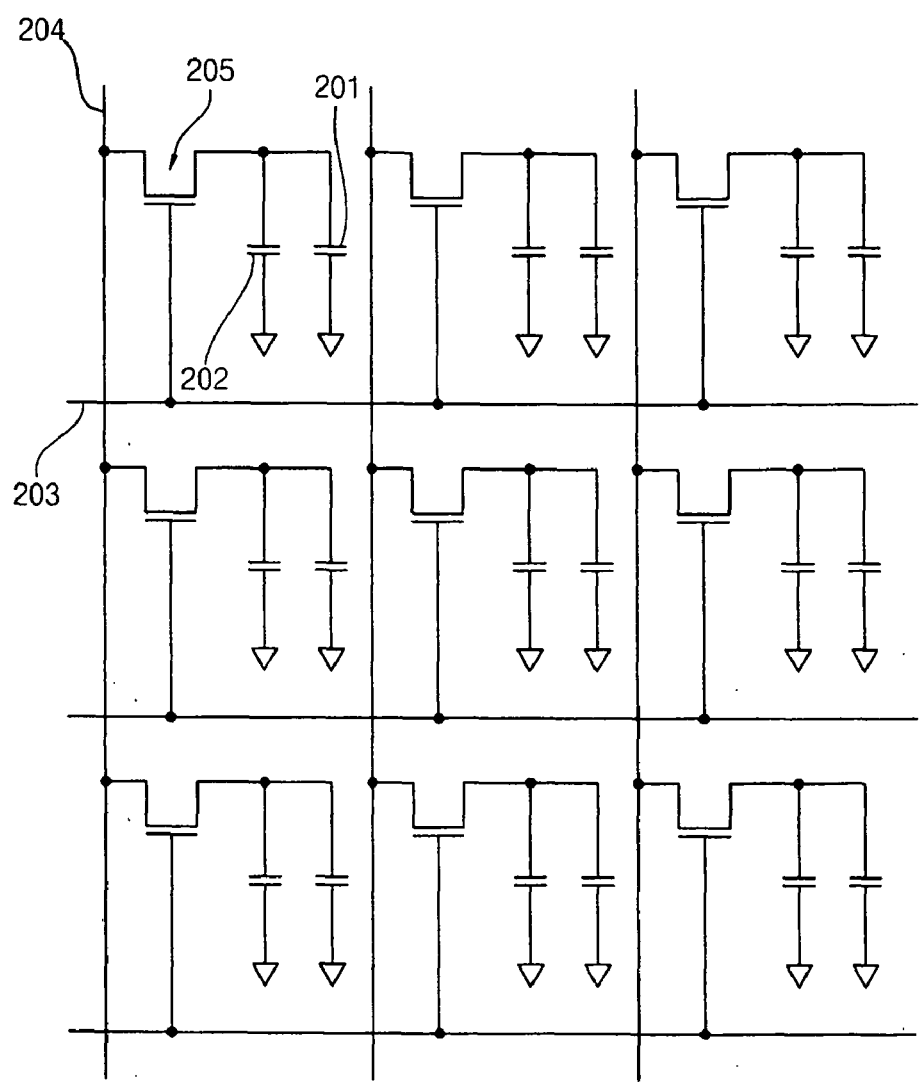
FIG. 2 is an equivalent circuit diagram of pixels in an LCD device.
Figure 2:

FIG. 2 is an equivalent circuit diagram of pixels in an LCD device.

Referring to FIG. 2, an LCD device includes a plurality of gate lines 203 and a plurality of data lines 204. Each of the data lines 204 extends along a first direction and is spaced apart from one another. Each of the gate lines 203 extends along a second direction that is substantially perpendicular to the first direction and is spaced apart from one another. The gate insulation layer is disposed between the gate lines 203 and the data lines 204.

Two adjacent data lines 204 and two adjacent gate lines 203 define a pixel. The pixel includes a thin film transistor (TFT) 205, a storage capacitor 201 and a liquid crystal capacitor 202. The TFT 205 includes a gate electrode, a drain electrode, a source electrode and a semiconductor layer.

The gate electrode of the TFT 205 is electrically connected to the gate line 203. The source electrode of the TFT 205 is electrically connected to the data line 204. The drain electrode of the TFT 205 is electrically connected to the storage capacitor 201 and the liquid crystal capacitor 202.

When a gate voltage is applied to the gate electrode of the TFT 205, the TFT 205 is turned on. After the TFT 205 is turned on, a pixel voltage of the data line 204 is applied to the storage capacitor 201 and the liquid crystal capacitor 202 through TFT 205.

When the pixel voltage is applied to the liquid crystal capacitor 202, an arrangement of liquid crystal molecules, which is interposed between a common electrode of the liquid crystal capacitor 202 and the pixel electrode, varies to change optical transmittance. Therefore, an image is displayed by a variation of the optical characteristic.

After the pixel voltage is applied to the liquid crystal capacitor 202, the storage capacitor 201 prevents the pixel voltage from varying when the pixel voltage is influenced by the peripheral voltage.

The pixel electrode of the liquid crystal capacitor 202 includes an electrically conductive and optically transparent material such as indium tin oxide (ITO), indium zinc oxide (IZO).

Also, the pixel electrode of the liquid crystal capacitor 202 further comprises a reflective electrode. The reflective electrode may have aluminum (Al), silver (Ag), molybdenum (Mo), tungsten (W), neodymium (Nd), copper (Cu), and an alloy thereof. The pixel electrode may have a multi-layer structure.

Figure 3:
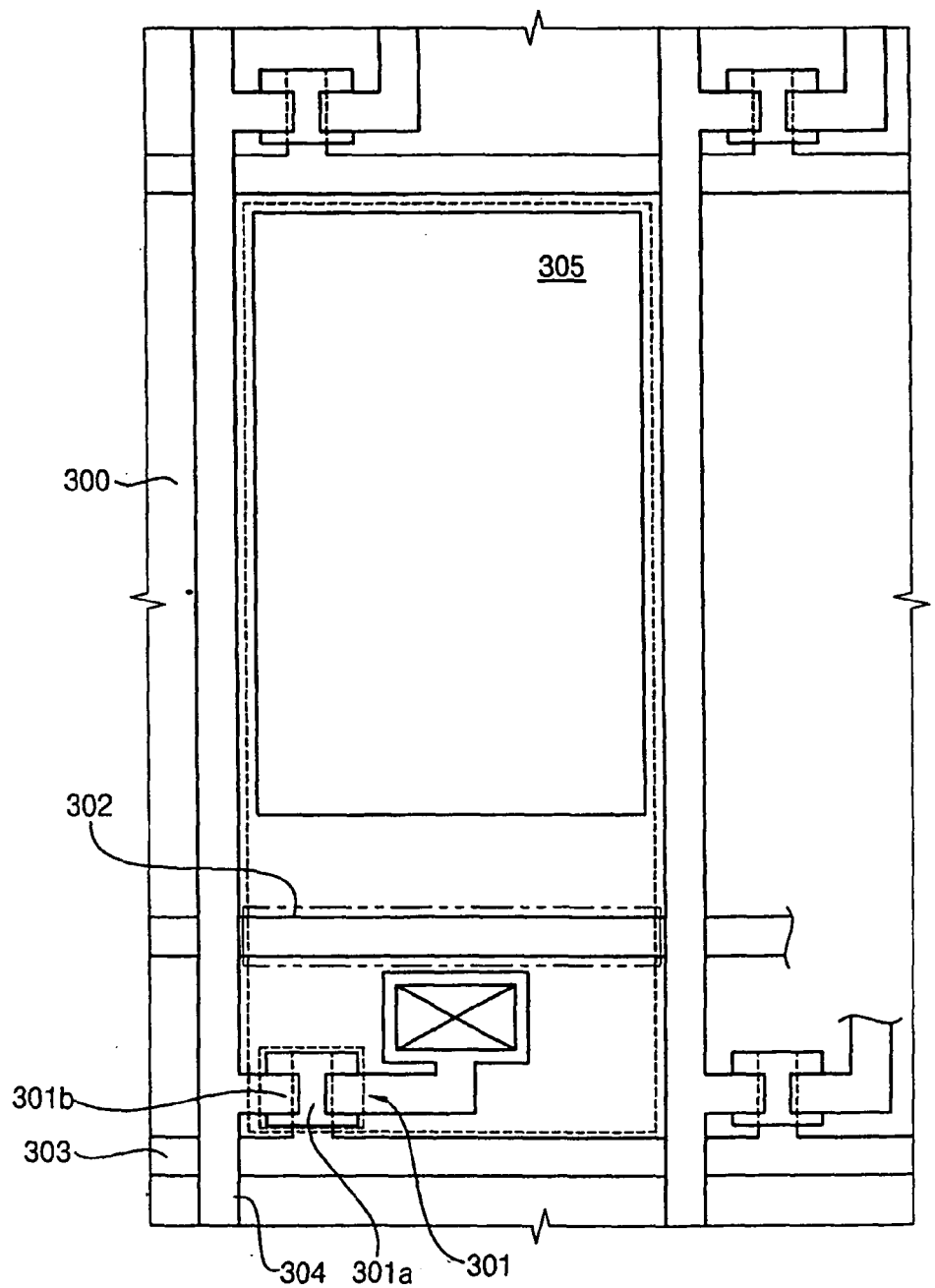
FIG. 3 is a layout illustrating an array substrate according to an exemplary embodiment of the present invention.

FIG. 3 is a layout illustrating an array substrate according to an exemplary embodiment of the present invention.

Referring to FIG. 3, an array substrate according to an exemplary embodiment of the present invention includes a substrate 300, a thin film transistor (TFT) 301, a storage capacitor 302, a pixel electrode 305, a gate line 303 and a data line 304.

The TFT 301 includes a gate electrode 301a formed on the substrate 300, a gate insulation layer (not shown) formed on the substrate 300 having the gate electrode 301a, a semiconductor layer (not shown) formed on the gate insulation layer in the TFT region, a data electrode 301b formed on the semiconductor layer.

The storage capacitor 302 includes a first storage capacitor electrode (not shown) formed on the substrate and spaced apart from the gate electrode 301a and a second storage capacitor electrode (not shown) formed on the gate insulation layer and including the same material as that of the pixel electrode 305.

The gate line 303 is electrically connected to the gate electrode 301a and the data line 304 is electrically connected to the data electrode 301b.

The passivation layer is formed on the substrate 300 having the data line 304 and patterned to form a contact hole and expose the gate insulation layer corresponding to the first storage capacitor electrode by photolithography process.

The pixel electrode 305 is formed on the substrate 300 having the patterned passivation layer. Then, the pixel electrode 305 is electrically connected to the data electrode 301b through a contact hole and a portion of the pixel electrode 305 is positioned over the first storage capacitor electrode and formed on the gate insulation layer to act as a second storage capacitor electrode.

Therefore, an aperture ratio is enhanced without reducing the capacitance of the storage capacitor 302 by removing a part of the passivation layer corresponding to a storage capacitor region by using a partial exposure mask.

Hereinafter, a method of manufacturing the array substrate will be explained referring to FIGS. 4A to 4G.

FIGS. 4A to 4G are cross-sectional views illustrating a method of manufacturing an array substrate according to an exemplary embodiment of the present invention.

Figure 4A:
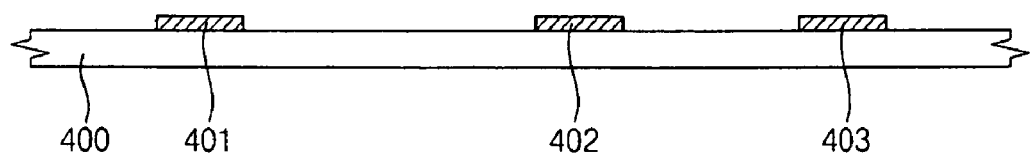
FIGS. 4A to 4G are cross-sectional views illustrating a method of manufacturing an array substrate according to an exemplary embodiment of the present invention.

Referring to FIG. 4A, after a conductive layer (not shown) is formed on a substrate 400, a photo resist layer (not shown) is formed on the conductive layer. The photo resist layer is patterned to form a photolithography mask (not shown). Then, the conductive layer is patterned through the photolithography mask to form a gate electrode 401, a first capacitor electrode 402 and a gate pad electrode 403. The conductive layer may have a single-layer or multi-layer structure, and include aluminum (Al), molybdenum (Mo), tungsten (W), neodymium (Nd), copper (Cu) and an alloy thereof.

Figure 4B:
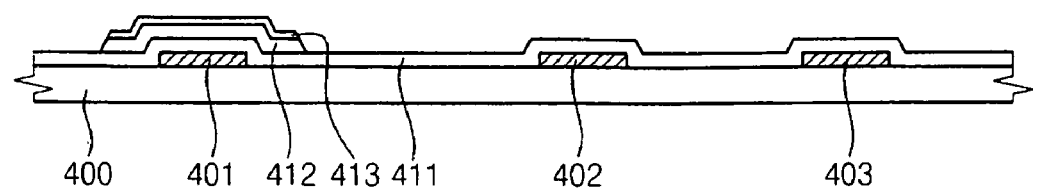

Referring to FIG. 4B, after a gate line 401 is formed, an insulation material is coated on the substrate 400 having a gate electrode 401, the first capacitor electrode 402 and the gate pad 403 to form a gate insulation layer 411. The gate insulation layer 411 includes silicon oxide (SiO2) or silicon nitride (SiNx), and the thickness of the gate insulation layer 411 may range from about 1000 angstroms to about 5000 angstroms.

A semiconductor material layer (not shown) is formed on the gate insulation layer 411 and an ohmic contact material layer (not shown) is formed on the semiconductor material layer. Then, the semiconductor material layer and the ohmic contact material layer are patterned by photolithography process to form a semiconductor layer 412 and an ohmic contact layer 413 in the TFT region. The semiconductor layer 412 includes amorphous silicon or polycrystalline silicon and the thickness of the semiconductor layer 412 may range from about 1000 angstroms to about 3000 angstroms.

Figure 4C:
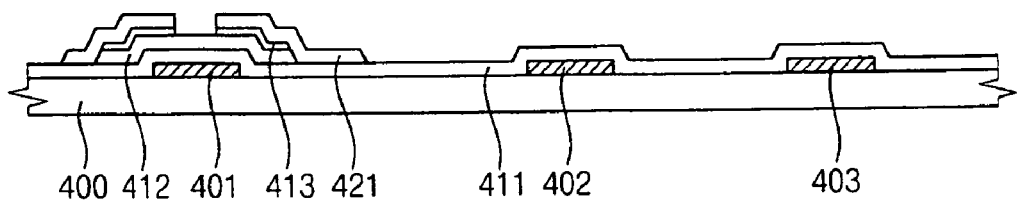

Referring to FIG. 4C, after a conductive layer (not shown) is formed on the substrate having the semiconductor layer 412 and the ohmic contact layer 413, a photo resist layer (not shown) is formed on the conductive layer. The photo resist layer is patterned to form a photolithography mask (not shown). Then, the conductive layer is patterned through the photolithography mask to form a data electrode 421 and a data pad electrode (not shown).

Figure 4D:
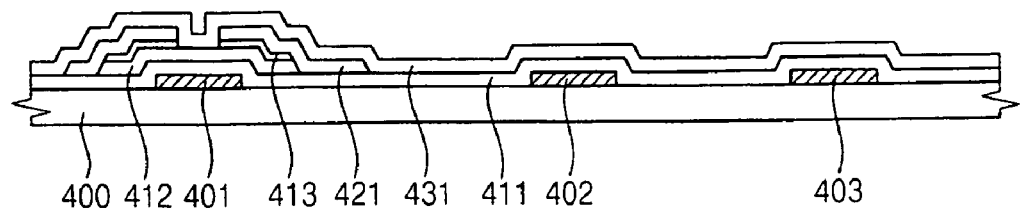

Referring to FIG. 4D, an insulation material is coated on the substrate having the data electrode 421 and the data pad electrode to form a passivation layer 431.

Figure 4E:
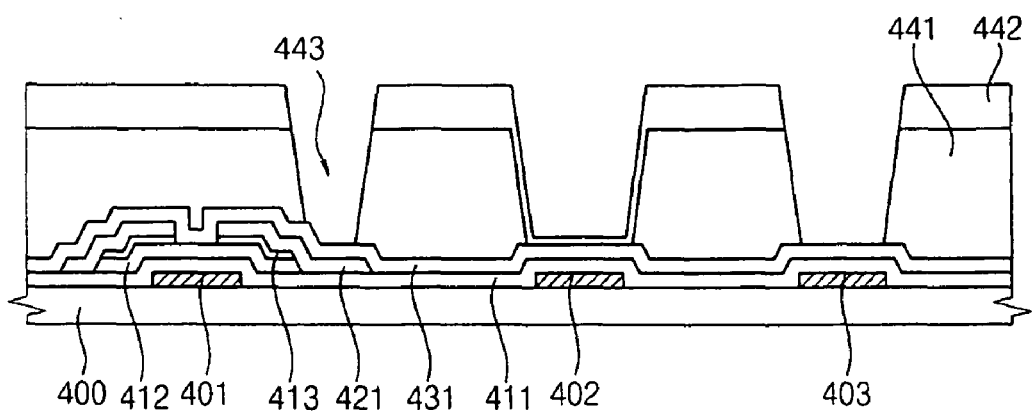

Referring to FIG. 4E, after an insulation layer 441 is formed on the passivation layer 431, a photo resist layer 442 is coated on the substrate having the insulation layer formed thereon. The photo resist layer corresponding to the data electrode 421, the first storage capacitor electrode 402 and the gate pad electrode 403 is removed. Then, the insulation layer 441 corresponding to the data electrode 421 and the gate pad electrode 403 is removed by a full exposure and the insulation layer 441 corresponding to the first storage capacitor electrode 402 is removed to remain a part of the insulation layer by a partial exposure process. Thus, a via hole 443 corresponding to the data electrode 421 is formed and the passivation layer 431 corresponding to the gate pad electrode 403 is exposed.

The insulation layer 441 may have a photo sensitive characteristic and include an organic layer. Also, the partial exposure mask includes a full exposure area, a shielding area, a partial exposure area and a pattern of the partial exposure area may have slit pattern or a half tone pattern.

Figure 4F:
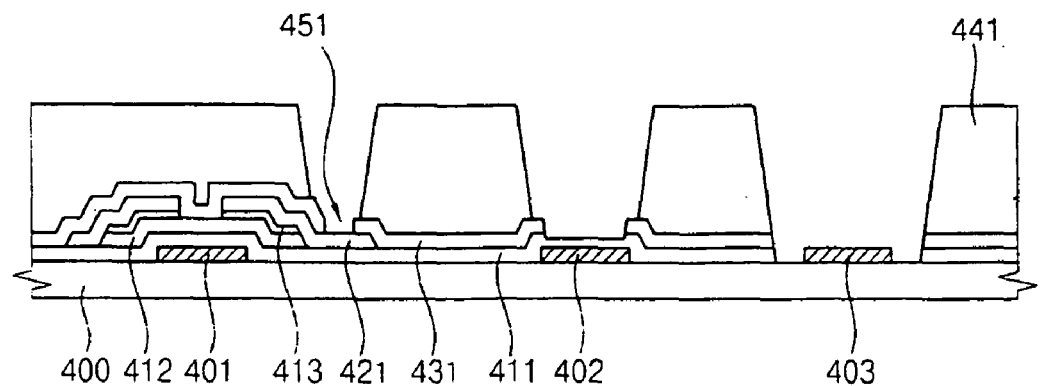

Referring to FIG. 4F, the passivation layer 431 is patterned to form a contact hole 451 and to expose the gate insulation layer 411 corresponding the first storage capacitor electrode 402. And the passivation layer 431 and the gate insulation layer 411 corresponding to the gate pad electrode 403 are removed to expose the gate pad electrode 403.

Figure 4G:
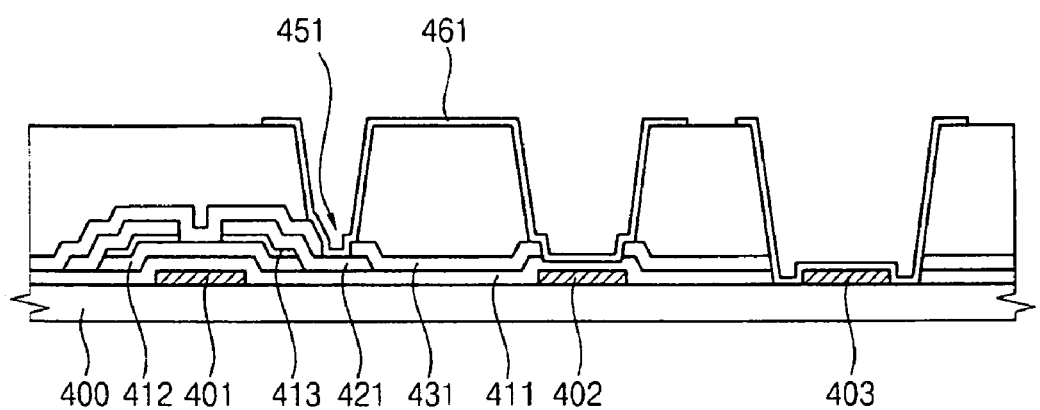

Referring to FIG. 4G, a transparent conductive layer (not shown) is deposited on the patterned insulation layer 441 and patterned to form a pixel electrode 461 that is electrically connected to the data electrode 421 through the contact hole 451. And a portion of the pixel electrode 461 that is positioned over the first storage capacitor electrode 402 and formed on the gate insulation layer acts as the second storage capacitor electrode 461. Also, a portion of the transparent conductive layer is patterned to form a pad electrode that is electrically connected to the gate pad electrode 403. The pad electrode may cover the upper and side portion of the gate pad electrode 403 to improve electrical characteristic.

The pixel electrode 461 includes an electrically conductive and optically transparent material such as indium tin oxide (ITO), indium zinc oxide (IZO).

Also, the pixel electrode 461 further comprises a reflective electrode. The reflective electrode may have aluminum (Al), silver (Ag), molybdenum (Mo), tungsten (W), neodymium (Nd), copper (Cu) and an alloy thereof. The pixel electrode may have a multi-layer structure.

Figure 5:
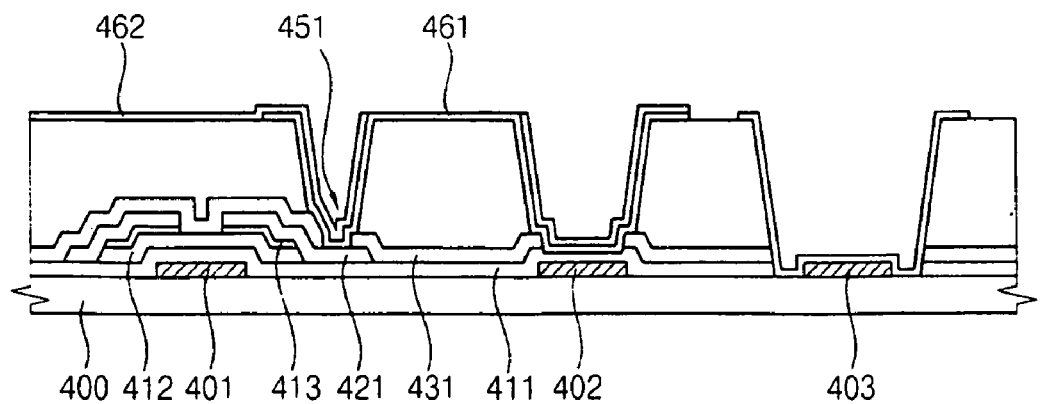
FIG. 5 is a cross-sectional view illustrating a reflective-transmissive type LCD panel.

FIG. 5 is a cross-sectional view illustrating a reflective-transmissive type LCD panel.

Referring to FIG. 5, a reflective metal is deposited on the transparent electrode and patterned to form a reflective electrode 462. The reflective electrode 462 defines a reflection area where ambient light reflects.

Thus, the reflective-transmissive type LCD device can function as both transmissive and reflective type LCD at the same time. And the reflective-transmissive type LCD devices can use both the light from a backlight assembly and ambient light sources.

An image is displayed through a combination of pixels which has the above explained structure.

According to embodiments of the present invention, only the gate insulation layer is deposed between the first storage capacitor electrode and the second storage capacitor electrode. Therefore, a capacitance of the storage capacitor is enhanced without increasing the size of the storage capacitor and reducing of an aperture ratio.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. An array substrate comprising:
   a substrate;
   a thin film transistor including a gate electrode formed on the substrate, a gate insulation layer formed on the gate electrode, a semiconductor layer formed on the gate insulation layer, and a data electrode formed on the semiconductor layer;
   a passivation layer formed on the thin film transistor;
   an organic insulation layer that is formed on the passivation layer;
   a pixel electrode that is formed on the passivation layer and is electrically connected to the data electrode through a contact hole formed at the passivation layer; and
   a storage capacitor including a first storage capacitor electrode that is spaced apart from the gate electrode of the thin film transistor and a first portion of the pixel electrode,
   wherein a distance between the first storage capacitor electrode and the first portion of the pixel electrode is smaller than a thickness of the gate insulating layer, and
   wherein the gate insulation layer directly contacts the passivation layer on a region adjacent to the first storage capacitor electrode.

2. The array substrate of claim 1, further comprising:
   a gate pad electrode that is spaced apart from the gate electrode of the thin film transistor and the first storage capacitor electrode and is exposed on upper and side portions.

3. The array substrate of claim 2, wherein a second portion of the pixel electrode covers the upper and side portions of the gate pad electrode.

4. The array substrate of claim 1, wherein the passivation layer includes silicon nitride.

5. The array substrate of claim 1, wherein the pixel electrode includes one of indium tin oxide (ITO) and indium zinc oxide (IZO).

6. A display device comprising:
   a liquid crystal capacitor that is electrically connected to a thin film transistor having a gate electrode, a data electrode including a source electrode and a drain electrode that is spaced apart from the source electrode, and a gate insulation layer that is disposed between the gate electrode and the data electrode, wherein the liquid crystal capacitor is defined by a pixel electrode, a common electrode and a liquid crystal layer disposed between the pixel electrode and the common electrode; and
   a storage capacitor that is electrically connected to the liquid crystal capacitor in parallel to maintain a pixel voltage applied to the liquid crystal capacitor for one frame, the storage capacitor including a first storage capacitor electrode and a portion of the pixel electrode, wherein the gate insulation layer is deposed between the first storage capacitor electrode and the portion of the pixel electrode,
   wherein a distance between the first storage capacitor electrode and the portion of the pixel electrode is smaller than a thickness of the gate insulation layer, and
   wherein the gate insulation layer directly contacts a passivation layer on a region adjacent to the first storage capacitor electrode.

\* \* \* \* \*